Figure 1:
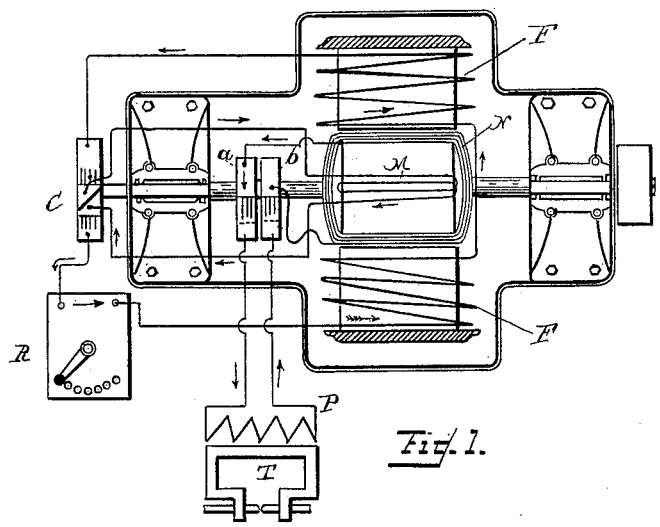

(No Model.) 3 Sheets—Sheet 1.

H. LEMP.
COMPOUND WOUND ALTERNATING CURRENT DYNAMO.

No. 405,263. Patented June 18, 1889.

Witnesses
Ira R. Steward
Wm. H. Capel

Inventor
Hermann Lemp
By his Attorney
H. C. Townsend (No Model.) 3 Sheets—Sheet 2.

H. LEMP.
COMPOUND WOUND ALTERNATING CURRENT DYNAMO.

No. 405,263. Patented June 18, 1889.

Witnesses
Ira R. Steward
Wm H. Capel

Inventor
Hermann Lemp.
By his Attorney
H. C. Townsend (No Model.) 3 Sheets—Sheet 3.
H. LEMP.
COMPOUND WOUND ALTERNATING CURRENT DYNAMO.
No. 405,263. Patented June 18, 1889.
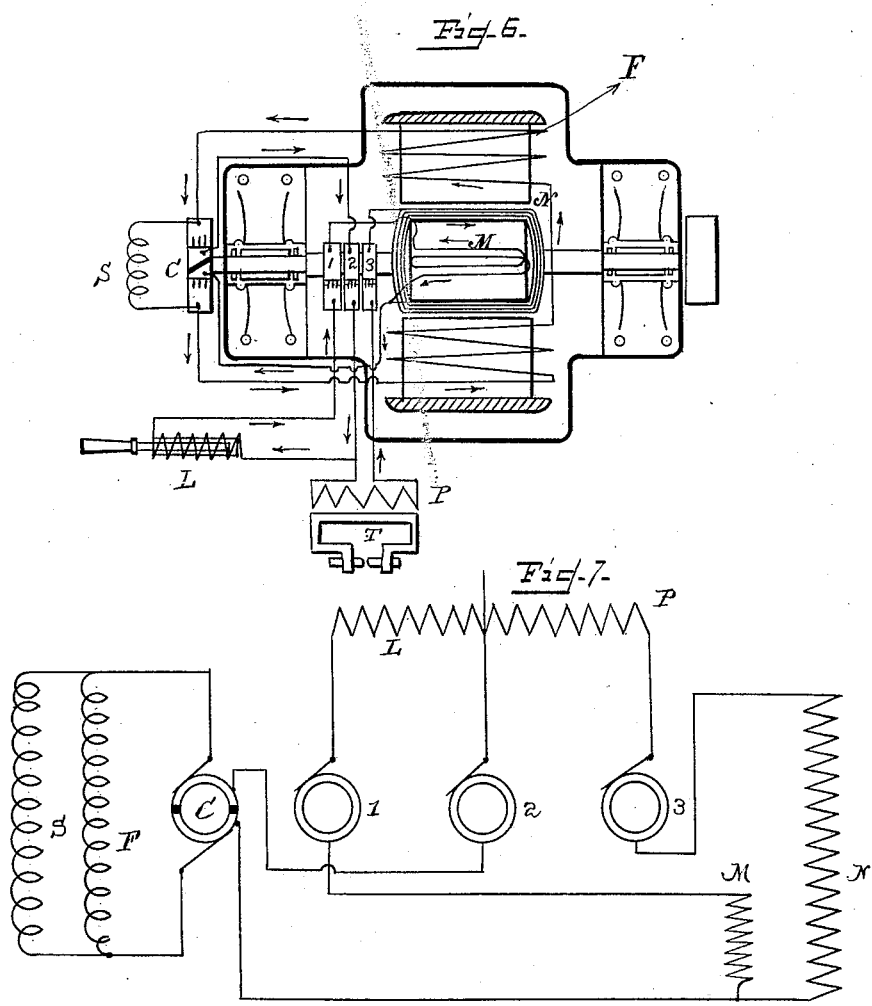
Witnesses
Ira R. Steward
Wm. H. Capel
Inventor
Hermann Lemp.
By his Attorney
H. C. Townsend

UNITED STATES PATENT OFFICE.

HERMANN LEMP, OF LYNN, MASSACHUSETTS.

COMPOUND-WOUND ALTERNATING-CURRENT DYNAMO.

SPECIFICATION forming part of Letters Patent No. 405,263, dated June 18, 1889.

Application filed March 2, 1889. Serial No. 301,788. (No model.)

*To all whom it may concern:*

Be it known that I, HERMANN LEMP, a citizen of the United States, and a resident of Lynn, in the county of Essex and State of Massachusetts, have invented a certain new and useful Compound-Wound Alternating-Current Dynamo, of which the following is a specification.

My invention relates to dynamo-electric machines in which field-excitation is produced by current taken from the armature-coil which supplies the work, and more particularly to machines which are arranged to supply alternating currents to the work, while being at the same time self-excited by commuted current derived from the same armature-coil which supplies the work.

My invention is especially useful in connection with dynamo-machines which supply alternating current to the primary of a converter, the secondary of which, being properly constructed or wound, supplies a current of large volume but low electro-motive force to suitable clamps holding pieces of metal to be welded by the passage of current from one to the other, while they are subjected to pressure after the now well-known process of electric welding, or supplying a large volume of current for any other kind of work demanding a variable amount of electrical energy.

My invention involves the compounding of the electric energy from different sources in the maintaining of the field of the machine, and the object is to do away with the disadvantages attending the operation of machines where the action or behavior is similar to that of a shunt-supplied field as well as those which attend the operation of a series machine, while at the same time securing the advantages belonging to each. These disadvantages and advantages are particularly noticeable in the case of dynamo-machines supplying current to the primary of an induction-coil for electric welding or other metal-working operations.

The invention consists, essentially, in passing an exciting-current through the same field-magnet coil, both from the main circuit-coil of the machine or that which supplies current to the work and from a separate exciting source, which latter is preferably for the sake of simplicity, on the same armature or in the same field with the work-circuit armature-coil, although it may be an entirely separate machine.

My invention consists, further, in certain preferred arrangements and combinations in which the exciter-coil and work-circuit coil are both on the same machine, and the regulation is effected by changes in the circuit of the exciter-coil only, as will presently appear.

Figure 2:
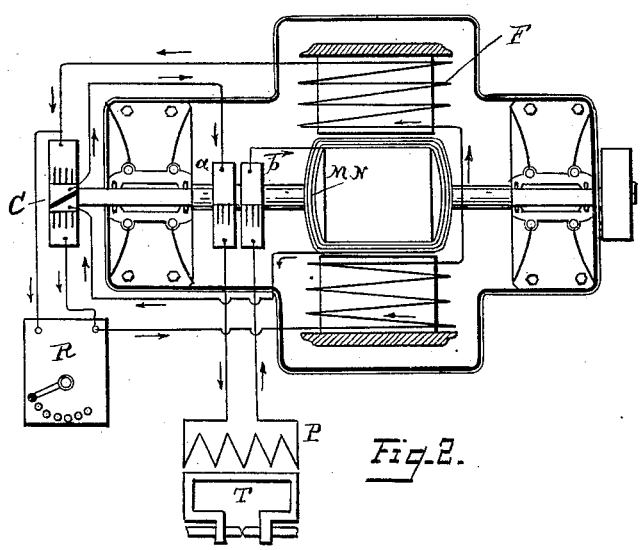
Figure 3:
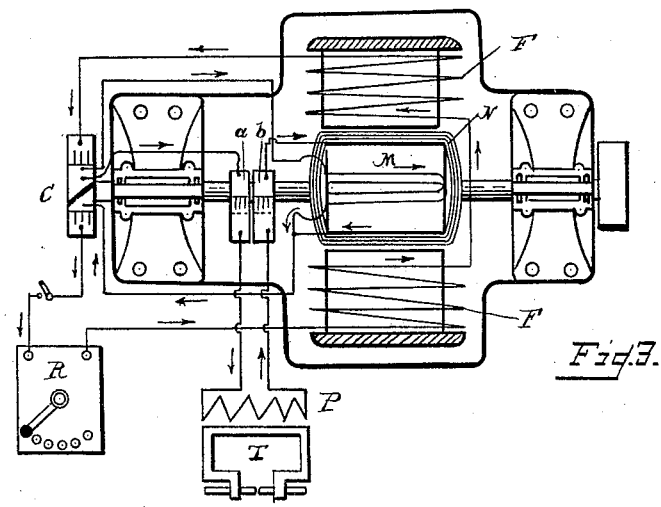
Figure 4:
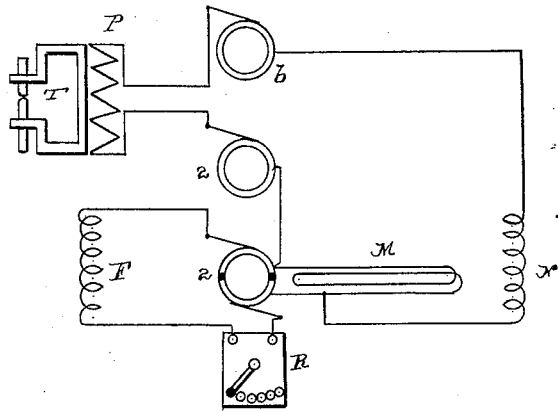
Figure 5:
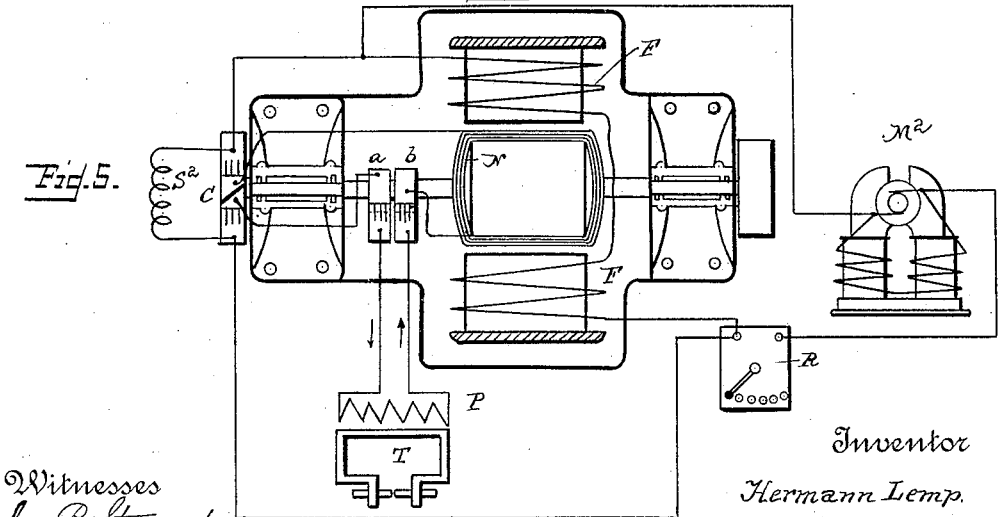

In the accompanying drawings, Figures 1 and 2 each illustrate diagrammatically and in plan view machines and circuits heretofore employed. Fig. 3 shows in plan view a machine and circuits embodying my invention. Fig. 4 is a diagram of the circuits of Fig. 3 removed from the machine. Fig. 5 illustrates an arrangement the equivalent of that shown in Fig. 3. Fig. 6 shows in plan a modified arrangement, and Fig. 7 is a diagram of the circuits of Fig. 6 removed from the machine.

In order that the principles and advantages of my invention may be better understood, I will first describe the peculiar actions of the machine illustrated in Fig. 1, which behaves in a similar manner to a shunt-wound machine. This machine is a form heretofore used in electric-lighting work where it is desired to obtain an alternating current on the main circuits together with self-excitation, and has likewise been employed for supplying alternating current to the primary of a "welding-coil" or transformer, the secondary of which connects to the clamps of an electric welding apparatus.

N indicates a coil or coils wound on the armature of the machine, and forming the work-circuit coil of the machine, which coil supplies alternating current to the work through suitable contact-rings $a\ b$, secured to the armature-shaft and provided with stationary contact-brushes, to which the terminals of the work-circuit may be connected. P is the primary of the transformer or welding-coil in such work-circuit, and T the secondary connected with the welding-clamps. The parts shown are merely typical of any similar devices for a similar purpose.

M indicates another armature-coil, usually of a small number of turns, and applied to the armature in any desired manner, either the same or differently from N, and forming an exciter-coil for the machine, for which purpose it is connected with the field-coil F through a commutator C, constructed to change its connections simultaneously with the reversals of current in M. A rheostat R, in circuit with M, controls the excitation and the output of the machine.

One way of applying the coils M N is shown in the patent to Elihu Thomson, No. 390,318. With a machine thus constructed and with a given number of turns in the primary of the welding-coil, if it be undertaken to weld a piece of iron, say, one inch in diameter in the clamps connected to the secondary, the machine will start with a certain current, depending on the amount of resistance in the rheostat usually employed in the circuit with the exciting-coil, and as the work heats the current will gradually increase, thus requiring a shifting back of the rheostat controlling the work in order to prevent burning of the pieces. This increase in the current passing to the work is due to the fact that when the iron is cold the current in the welding-circuit has a comparatively free path, and the coil N drains the energy from the coil M, thus subtracting a current from the field-coils of the machine, while as the metal heats up and the resistance increases in the circuit of the coil E less energy is consumed in such circuit and more energy is developed in the exciting-coil. The behavior of the machine in this respect is very similar to that of a simple shunt-wound machine.

Any bad contact in the clamps or at the point where the metals to be welded touch does not affect the "building up" of the machine, and in fact it will pick up the quicker the worse the contact. If now a change be made from work one inch in diameter to work one-half inch in diameter, and if the rheostat controlling the work be set in the same position as for one-inch stock, the exciter armature-coil will develop more current, because of the increased resistance in the work-circuit, and the machine will generate too great a current, the result being a danger of burning the metals at the weld. The only remedy for this is to increase the number of turns in the primary of the welding-coil. It is not even necessary to keep the rheostat in the same position for one-half inch and one-inch work. A certain resistance is required in order that the machine may pick up at all, and even that may be too much for small work if operated on a large machine.

In the arrangement of machine indicated in Fig. 2 the difficulty is of a converse nature. In this form of machine the coils M N upon the armature supply energy which passes through the work-circuit coil and also feeds the exciting-current to the field-magnet coils F of the machine. In this case, as before, the work-circuit is supplied with current through the two contact-rings $a$ $b$, upon which bear fixed brushes, as shown, connected to the primary P. The circuit, after passing through the work and through the rings and brushes, is carried to the commutator C, which, in obvious fashion, commutates the alternating currents after they pass the work and turns them into currents of one direction for exciting the field-magnet. The circuit is, as indicated, from one terminal of the armature-coil to a contact-ring and brush therefor, thence through the work to the brush for the other contact-ring, from the latter to one side of the commutator and one of the brushes therefor, thence through the field-magnet coil back to the other brush of the commutator, to the side of the commutator upon which said brush for the time being bears, and thence to the opposite terminal of the armature-coil.

The rheostat R controls the excitation of the machine by shunting the current around the commutator and field-magnet to the determinate or required amount. The characteristic of this method of excitation when applied to welding-work is that practically the machine cannot build up and generate current unless there is a very good contact between the pieces to be welded, because the welding-coil is practically in series with the field-magnet, and the reaction or counter electro-motive force in the circuit of the primary is so great when the contact is bad as to prevent a free flow of current through the armature-coil of the machine. In this form if the contact should be poor it would be necessary to remove the shunt provided by the rheostat R almost entirely in order to make the machine build up.

When the machine starts under the conditions supposed, the shunt must be brought back quickly to the proper point in order to prevent injury to the welding. Moreover, the resistance of the pieces to be welded being smallest at the start, the current will, through a given setting of the rheostat, be a maximum at the start and will greatly diminish as the work heats up.

If the same winding be used on the welding-coil for small work as for large work, the condition of the shunt being at the same time such as required for normal working or even entirely removed, the dynamo will not begin to generate at all, the smaller pieces acting like an imperfect contact for the larger pieces. In order to make the apparatus work properly, the number of turns on the primary P must be reduced. This method is in some respects advantageous, as the work is not likely to be burned by an unskillful operator; but the action is very fickle. The machine may start or it may not, and it will be often found that much manipulation is required in order to make it perform its duties properly under adverse circumstances.

In both the arrangements shown in Figs. 1 and 2 a different number of turns on the welding-coil is required for different sizes of work, in order that the machine may operate to advantage. Both require the setting of the rheostat at a different point at the start from that proper at the finish, which obviously is undesirable in the case of machinery which may be placed in the hands of inexperienced persons. A preferred arrangement would be to have the rheostat set in a given position for a given size of work, and to close the switch which permits current to flow to the work, and finally open it when the work is done without any manipulation of rheostat or brushes during the whole operation. This desirable result may be accomplished by the arrangement to be now described, involving the employment of two exciting sources for the field-magnet coil F, one source being the work-circuit armature-coil and the other an independent source, as will be described, which supplies current to the field-coil in multiple with the work-circuit armature-coil.

One arrangement involving this principle is indicated in Figs. 3 and 4. M indicates the exciter-coil, wound on a proper armature and having its two terminals connected to the segments of a commutator C. The brushes of said commutator connect with the field-magnet coil F, so that the commutated current passes through said coil. The coil M may be termed the "short-circuit" coil. The coil N, revolving in the same field with M, has one of its terminals connected to the same commutator-segment with one terminal of coil M, while its other terminal connects in obvious fashion by means of contact-rings 3 2 and brushes therefor through the work with the commutator-segment to which the other end of coil M connects. The direction of winding or the connections are such that the current generated in both coils will flow in the same direction through the field-magnet coil F. The rheostat R is in the circuit of the current flowing from both coils. As the coil M is short as compared with coil N and its electro-motive force small, it is obvious that any change in the resistance R will produce a great effect in the delivery of exciting-currents from the coil M and comparatively little effect on the current flowing from coil N through the field and to the work. By the use of the resistance thus arranged the influence of the exciting-coil M may be varied to suit the different sizes of stock to be welded, or, in other words, to the differences in the work to be performed by the machine. The influence of the main circuit coil N will be slightly changed; but the design is that it should be, as far as possible, once for all determined in constructing the machine. A little adjustment of it may be desirable under certain conditions, and that is provided in the arrangement to be presently described in connection with Fig. 5.

With the arrangements shown in Figs. 3 and 4 it does not make any difference what size stock is welded, so far as the winding of the welding-coil is concerned, and the apparatus will work with advantage for all sizes of stock as far as the capacity of the dynamo will permit with a constant number of turns in the primary of the welding-coil.

Any bad contact does not affect the building up of the machine as it builds up with the exciting-coil M alone.

The rheostat may be set at the start in a certain position and the switch turned on, and when the work is completed the current may be shut off without any regulation being required during the operation. The current may be kept constant during the whole action, or it may be made to drop or rise as special work may require, this difference of action being obtained by giving the preponderance to the exciting influence of either the separate or independent exciter M, or to the series excitation of the coil N.

Instead of using an exciter M on the same armature or in the same field with the work-circuit coil N, I may use, as indicated in Fig. 5, a separate exciting-machine $N^2$, which is connected with the field-magnet coils through the rheostat R in obvious fashion. The work-circuit armature-coil N in the field excited by $N^2$ supplies current to the work through the rings $a\ b$, and its current is also delivered to the field-magnet coil F as a continuous current and in multiple with the current from exciter $N^2$ by means of a commutator C, which locally commutates the alternating currents after they pass through the work. In this arrangement the rheostat is obviously in the circuit only of the exciter, and it may be used to change the action of the machine in obvious manner. The influence of the work-circuit should be once for all determined in constructing a machine. A capacity for a little adjustment is, however, provided by the shunt $S^2$ around the commutator, which may be of any desired variable character. This shunt will obviously only affect the current in the work-circuit. In this arrangement the current generated in $M^2$ may be regulated by means of the rheostat R in circuit with the same, which current traverses the field-magnet F and excites the machine to a degree depending upon the setting of the rheostat. When the rheostat is set, the current in such circuit can never increase, but may be diminished if the current flowing through the main or work circuit to the field-coil should become such as to materially increase the difference in potential at the terminals of the field-magnet. In the case of a great increase the current furnished by the exciter would be greatly diminished. The increase of current in the field, due to the influence of the work-circuit coil N, will obviously be proportionate to the work performed in that circuit.

The rapidity of field-excitation may be hastened or slowed by means of the rheostat in series with the exciter $M^2$, just as it would by setting the rheostat in the arrangement shown in Figs. 3 and 4.

A preferred arrangement similar in most respects to that of Figs. 3 and 4 is illustrated diagrammatically in Figs. 6 and 7. The arrangement of the two latter figures permits the employment of a variable resistance in the circuit of the exciter-coil M only, the current developed by the work-circuit coil N flowing to the work independently of such exciter, but at the same time flowing through the field-coil F in multiple with the current of the exciter M. Two of the terminals of the coils M N are connected to the same segment of the commutator C, as clearly shown, and the opposite terminal of the coil N connects with the opposite commutator-plate through the work-circuit by means of the rings 2 3, as explained in connection with Fig. 3. The corresponding terminal of M, however, instead of being connected directly to the same commutator-segment, passes out through a collector-ring 1, mounted on the shaft of the machine, so as to revolve with coil M, and having a fixed brush, as shown, which connects with a variable resistance L, and thence by means of a fixed brush and revolving contact-ring to the commutator C. For convenience I employ the ring 2, which permits connection of the work with said revolving commutator.

The variable resistance L is in the present instance made up of a coil having a large counter electro-motive force, which is produced by winding said coil upon a mass of iron in a way well understood in the art. Any other resistance might be used in place of this counter electro-motive force coil or kicking-coil. I prefer a resistance such as indicated, because it does not absorb energy to the same extent as an ordinary resistance and is smooth in its action when the variation of action is produced by any of the ordinary means known in the art. Any adjustment of this coil will obviously affect only the circuit of the coil M. By the adjustment of this coil the machine may be made to act more or less like a shunt-machine, in accordance with the will of the operator.

The particular arrangement shown possesses also the advantage that the number of leads heretofore necessary between the welding-table and the dynamo-machine is lessened. Where a rheostat is employed for controlling the dynamo, it is obvious that there must be two connections from such rheostat to the welding-table, where the rheostat is within reach of the operator, and that in addition there must be the two leads from the shunt to the primary of the welding-coil. By connecting the variable resistance L, as shown, to the brush-bearing on the ring 2 and by employing the auxiliary ring 1 and fixed brush I am enabled to obtain the same regulation by the use of the additional lead only, which connects the variable resistance with the fixed brush for ring 1.

It is obvious that with the regulation of the shunt of no self-induction around the field-circuit the effect of circuit M, controlled by the kicking-coil, may be used in addition to the effect of the series-coil controlled by the former.

What I claim as my invention is—

1. In a dymano-electric machine, the combination, with the field-magnet coil fed by an armature-coil in circuit with the work, of a separate exciting source feeding the same field-magnet coil in multiple with the said armature-coil.

2. The combination of a transformer whose primary is in the uncommuted portion of the circuit of the armature of a dynamo, a field-magnet coil in a locally-commuted portion of said circuit and in series with the primary, and an exciter armature-coil operated in a field excited by its own currents and also connected to the field-magnet coil, as and for the purpose described.

3. The combination, with a transformer for supplying large-volume electric currents, of a dynamo-machine having a work-circuit armature-coil in series with the primary of the transformer and a separate exciter connected in multiple with the first to the field-magnet exciting-circuit, as and for the purpose described.

4. The combination, with a dynamo-machine having an armature-coil and field-magnet coil in series with variable work, of a separate exciting-coil feeding the field in multiple with the first armature-coil, as and for the purpose described.

5. The combination, with a dynamo-machine having a field-coil in series with an armature-coil and commutator, of a transformer having its primary in a portion of said circuit where the current is uncommuted, and a separate armature-coil supplying commuted current in multiple with the first-named armature-coil to the field coil or circuit.

6. The combination, in a dynamo-machine, of a main-circuit armature-coil in series with the work and field-magnet coil and an exciter source or coil independent thereof feeding the main coil in multiple with the first.

7. In a dynamo-electric machine, the combination, with a work-circuit coil, of an exciter-coil, a commutator between the same and the field-coil, a collector-ring between a terminal of the exciter-coil and the commutator, and a variable resistance between the collector-brush for said ring and the commutator.

8. The combination, with the exciter-coil and the work-circuit coil, of two collector-rings in the circuit of the exciter-coil, a variable resistance in the connection of the collector-brushes therefor, two collector-rings in the circuit of the work-coil, brushes bearing on the same and including the work in circuit between them, and a commutator in the circuit of both coils and between the same and the field-magnet.

9. In a dynamo-electric machine, the combination, with the work-circuit coil connected to the work through a suitable collecting-ring, of an exciting armature-coil connected to a separate collecting-ring and a variable reactive coil in the connection from the brush of said ring to the circuit of the first-named coil, as and for the purpose described.

10. In a dynamo-electric machine, the combination, with two revolving armature-coils, of a field-magnet coil and a commutator to which one terminal of each armature-coil is connected, collector-rings to which the opposite terminals of the coils are connected, and a third ring connected to the opposite side of the commutator, as and for the purpose described.

Signed at Lynn, in the county of Essex and State of Massachusetts, this 27th day of February, A. D. 1889.

HERMANN LEMP.

Witnesses:
WILL J. HALL,
J. W. GIBBONEY.